United States Patent
Yonezawa et al.

(10) Patent No.: US 9,960,695 B2
(45) Date of Patent: May 1, 2018

(54) POWER SUPPLY APPARATUS AND ERROR DETECTING METHOD FOR POWER SUPPLY APPARATUS

(71) Applicant: FUJITSU LIMITED, Kawasaki-shi, Kanagawa (JP)

(72) Inventors: Yu Yonezawa, Sagamihara (JP); Takahiko Sugawara, Kawasaki (JP); Yoshiyasu Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/372,990

(22) Filed: Dec. 8, 2016

(65) Prior Publication Data

US 2017/0201184 A1    Jul. 13, 2017

(30) Foreign Application Priority Data

Jan. 8, 2016   (JP) ................. 2016-002270

(51) Int. Cl.
*H02M 3/335* (2006.01)
*H02M 1/32* (2007.01)

(52) U.S. Cl.
CPC ......... *H02M 3/33546* (2013.01); *H02M 1/32* (2013.01)

(58) Field of Classification Search
CPC ......... H02M 3/33523; H02M 3/33546; H02M 3/33563; H02M 3/33592; H02M 1/32
USPC ................. 323/217, 271, 274, 280, 282; 363/21.01–21.18, 41, 71
See application file for complete search history.

(56) References Cited

U.S. PATENT DOCUMENTS

| | | | | |
|---|---|---|---|---|
| 8,624,828 B2 * | 1/2014 | Uchimoto | ......... | H05B 33/0815 345/102 |
| 9,088,223 B2 * | 7/2015 | Park | ..... | H02M 1/4225 |
| 2007/0296375 A1 * | 12/2007 | Sakaguchi | ............ | H02P 29/032 318/811 |
| 2015/0311787 A1 * | 10/2015 | Maede | .................. | H02M 3/156 323/271 |
| 2017/0093281 A1 * | 3/2017 | Kim | ...................... | H02M 3/158 |

FOREIGN PATENT DOCUMENTS

| | | |
|---|---|---|
| JP | 06-351244 | 12/1994 |
| JP | 2003-092880 | 3/2003 |

* cited by examiner

*Primary Examiner* — Yemane Mehari
(74) *Attorney, Agent, or Firm* — Fujitsu Patent Center

(57) ABSTRACT

A power supply apparatus includes a trans circuit configured to convert an input voltage into an output voltage by adjusting switching of the input voltage; an output voltage detector configured to detect the output voltage; a compensator configured to generate a control value controlling a duty ratio of the switching such that a value of the detected output voltage coincides with a target value for the output voltage; an input voltage detector configured to detect the input voltage; an estimator configured to estimate an allowed range of the control value in accordance with the target value and a value of the detected input voltage; and an adjuster configured to adjust the control value so as to stop the switching when the control value falls outside the allowed range.

4 Claims, 17 Drawing Sheets

POWER SUPPLY APPARATUS AND ERROR DETECTING METHOD FOR POWER SUPPLY APPARATUS

CROSS-REFERENCE TO RELATED APPLICATION

This application is based upon and claims the benefit of priority of the prior Japanese Patent Application No. 2016-002270, filed on Jan. 8, 2016, the entire contents of which are incorporated herein by reference.

FIELD

The embodiments discussed herein are related to a power supply apparatus and an error detecting method for a power supply apparatus.

BACKGROUND

In a related structure, the output voltage of a power supply apparatus including a switching element may be controlled by changing a duty ratio of switching of the switching element in the power supply apparatus. In another related structure, the output voltage of a direct current to direct current converting device including a switching element may be controlled by changing a duty ratio of switching of the switching element in the direct current to direct current converting device.

Related art is disclosed in Japanese Laid-open Patent Publication No. 06-351244 and Japanese Laid-open Patent Publication No. 2003-92880.

SUMMARY

According to an aspect of the embodiment, a power supply apparatus includes a trans circuit configured to convert an input voltage into an output voltage by adjusting switching of the input voltage; an output voltage detector configured to detect the output voltage; a compensator configured to generate a control value controlling a duty ratio of the switching such that a value of the detected output voltage coincides with a target value for the output voltage; an input voltage detector configured to detect the input voltage; an estimator configured to estimate an allowed range of the control value in accordance with the target value and a value of the detected input voltage; and an adjuster configured to adjust the control value so as to stop the switching when the control value falls outside the allowed range.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
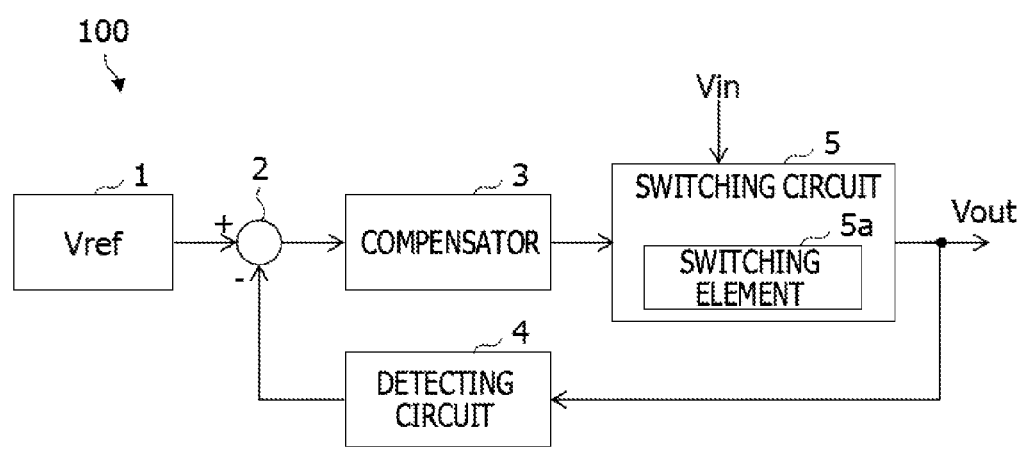
FIG. 1 is a block diagram illustrating an example of configuration of a power supply apparatus that generates an output voltage from an input voltage by switching of a switching element.

FIG. 1 is a block diagram illustrating an example of configuration of a power supply apparatus that generates an output voltage from an input voltage by switching of a switching element. A power supply apparatus 100 includes a switching circuit 5, a detecting circuit 4, a target voltage setting unit 1, an error arithmetic unit 2, and a compensator 3. The switching circuit 5 includes a switching element 5a. The switching circuit 5 converts an input voltage Vin into an output voltage Vout by the switching of the switching element 5a. The detecting circuit 4 detects the output voltage Vout output from the switching circuit 5, and outputs the detected value of the output voltage Vout. The target voltage setting unit 1 sets a target value Vref for the output voltage Vout. The error arithmetic unit 2 calculates an error between the target value Vref set by the target voltage setting unit 1 and the output value of the output voltage Vout which output value is output from the detecting circuit 4. The compensator 3 controls the duty ratio of the switching of the switching element 5a so as to make the error zero.

Figure 2:
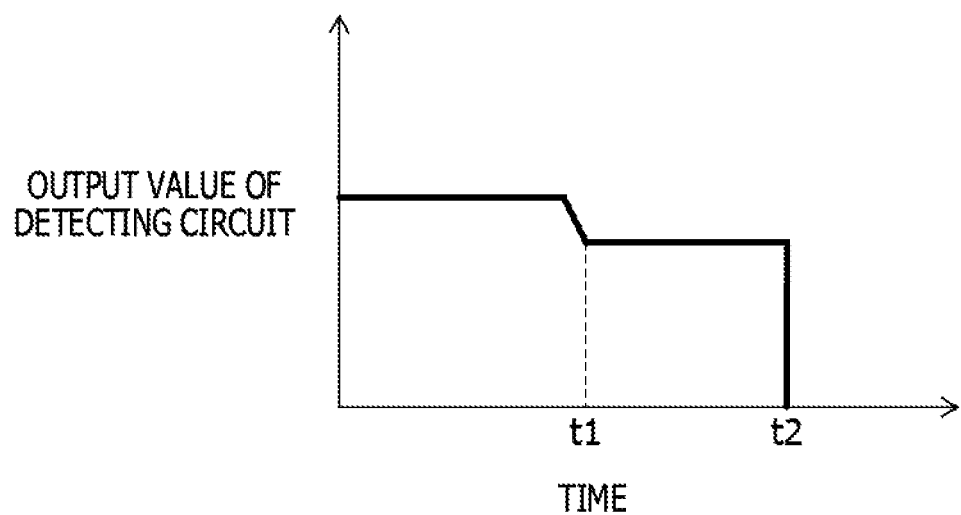
FIG. 2 is a diagram illustrating an example of changes in an output value of a detecting circuit.

In the power supply apparatus 100 as in FIG. 1, when a disconnection has occurred between the switching circuit 5 and the detecting circuit 4, the output value of the detecting circuit 4 becomes zero (see timing t2 in FIG. 2, for example), and therefore it may be determined that an abnormality due to the disconnection has occurred in the power supply apparatus 100. FIG. 2 is a diagram illustrating an example of changes in an output value of a detecting circuit. The detecting circuit may be the detecting circuit 4 illustrated in FIG. 1. However, when a degradation abnormality occurs in the power supply apparatus 100, the gain of the detecting circuit 4 changes, and thus the output value of the detecting circuit 4 also changes. Therefore, when the output value of the detecting circuit 4 is changed to a value other than zero (see timing t1 in FIG. 2, for example), it is difficult to determine whether the output value of the detecting circuit 4 is changed due to a variation in the output voltage Vout or is changed due to a degradation abnormality of the power supply apparatus 100. As a result, the power supply apparatus 100 may continue operating in the state of the degradation abnormality.

It is accordingly an object of the present disclosure to protect a power supply apparatus from continuing operating in the state of a degradation abnormality.

Figure 3:
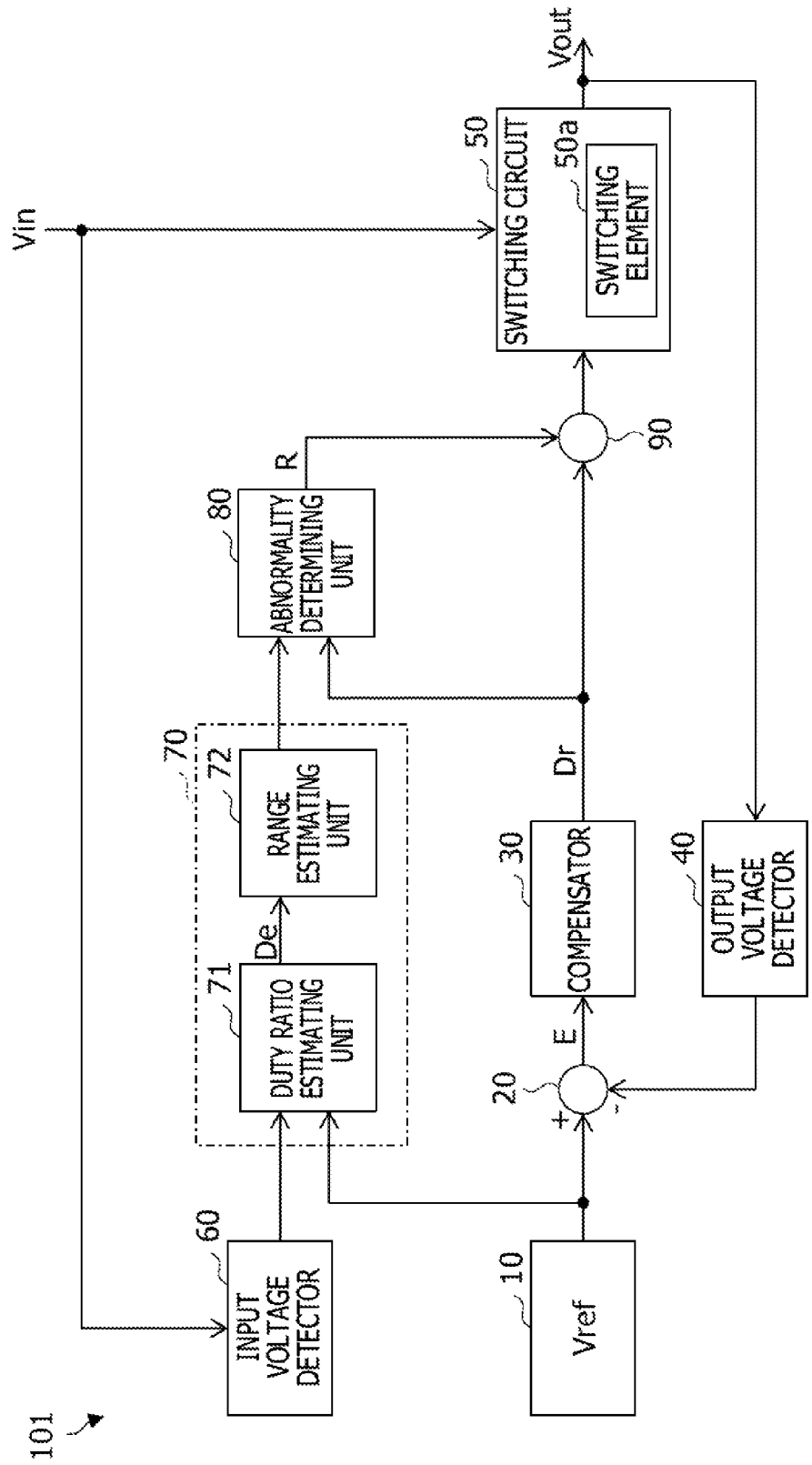
FIG. 3 is a block diagram illustrating an example of configuration of a power supply apparatus according to one embodiment.

FIG. 3 is a block diagram illustrating an example of configuration of a power supply apparatus according to one embodiment. A power supply apparatus 101 is an example of a switching power supply that generates a direct-current output voltage Vout from a direct-current input voltage Vin by the switching of a switching element 50a within a switching circuit 50. The power supply apparatus 101, for example, includes the switching circuit 50, an output voltage detector 40, a target voltage setting unit 10, an error arithmetic unit 20, a compensator 30, an input voltage detector 60, an estimator 70, an abnormality determining unit 80, and an adjustor 90.

The switching circuit 50 is an example of a trans converter that includes the switching element 50a and which converts the input voltage Vin input to the switching circuit 50 into the output voltage Vout by the switching of the switching element 50a. The switching circuit 50 subjects the direct-current input voltage Vin to voltage conversion, and outputs the direct-current output voltage Vout after the voltage conversion. The switching circuit 50 may be a step-down trans converter that steps down the input voltage Vin and which outputs the output voltage Vout after the step-down, or may be a step-up trans converter that steps up the input voltage Vin and which outputs the output voltage Vout after the step-up. Concrete examples of the switching element 50a include a bipolar transistor, a field-effect transistor, and the like.

The output voltage detector 40 is an example of a detecting unit that detects the output voltage Vout output from the switching circuit 50 and which outputs the detected value of the output voltage Vout. The output voltage detector 40 detects the voltage value of the output voltage Vout, and outputs an output voltage detected value corresponding to the detected voltage value. The output voltage detector 40, for example, includes a photocoupler detecting the output voltage Vout, and outputs the detected value of the output voltage Vout according to the output value of the photocoupler.

The target voltage setting unit 10 is an example of a setting unit that sets a target value Vref for the output voltage Vout. The target value Vref is, for example, set to a fixed reference value in advance.

The error arithmetic unit 20 calculates an error E between the target value Vref set by the target voltage setting unit 10 and the detected value of the output voltage Vout which detected value is output from the output voltage detector 40. The error arithmetic unit 20, for example, calculates the error E by subtracting the detected value of the output voltage Vout from the target value Vref.

The compensator 30 is an example of a compensator that generates a duty ratio control value Dr controlling a duty ratio D of the switching circuit 50 such that the detected value of the output voltage Vout which detected value is output from the output voltage detector 40 coincides with the target value Vref set by the target voltage setting unit 10. For example, the compensator 30 generates the duty ratio control value Dr controlling the duty ratio D of the switching circuit 50 such that the error E becomes zero. The duty ratio D of the switching circuit 50 represents the duty ratio of the switching of the switching element 50a in the switching circuit 50.

The input voltage detector 60 is an example of a detecting unit that detects the input voltage Vin input to the switching circuit 50, and which outputs the detected value of the input voltage Vin. The input voltage detector 60 detects the voltage value of the input voltage Vin, and outputs an input voltage detected value corresponding to the detected voltage value.

The estimator 70 is an example of an estimator that estimates a normal range Dx of the duty ratio control value Dr from the target value Vref set by the target voltage setting unit 10 and the detected value of the input voltage Vin which detected value is output from the input voltage detector 60. The normal range Dx is an example of an allowed range of the duty ratio control value Dr.

The estimator 70, for example, includes a duty ratio estimating unit 71 and a range estimating unit 72. The duty ratio estimating unit 71 is an example of a representative value estimating unit that estimates a representative value De of the duty ratio control value Dr from the target value Vref set by the target voltage setting unit 10 and the detected value of the input voltage Vin which detected value is output from the input voltage detector 60.

The duty ratio estimating unit 71, for example, estimates the representative value De based on a representative value estimating rule for estimating the representative value De from the target value Vref set by the target voltage setting unit 10 and the detected value of the input voltage Vin which detected value is output from the input voltage detector 60. The representative value estimating rule defines correspondence relation between the target value Vref, the detected value of the input voltage Vin, and the representative value De. The representative value estimating rule may be defined in advance by an estimation arithmetic expression, or may be defined in advance by a table (map). Respective concrete examples of the estimation arithmetic expression and the table (map) for estimating the representative value De will be described later. The estimation of the representative value De by the duty ratio estimating unit 71 based on the table may reduce a processing load on a CPU 114 (see FIG. 11; details will be described later) when the CPU 114 functions as the duty ratio estimating unit 71, for example.

The range estimating unit 72 estimates the normal range Dx from the representative value De of the duty ratio control value Dr. The representative value De is included in the normal range Dx. The range estimating unit 72, for example, includes an upper limit setting unit that sets an upper limit value Dmax of the normal range Dx to a value larger than the representative value De and a lower limit setting unit that sets a lower limit value Dmin of the normal range Dx to a value smaller than the representative value De. The normal range Dx is determined by setting the upper limit value Dmax and the lower limit value Dmin. For example, the upper limit setting unit sets the upper limit value Dmax to a value obtained by increasing the representative value De by a given amount of increase, and the lower limit setting unit sets the lower limit value Dmin to a value obtained by decreasing the representative value De by a given amount of decrease.

The upper limit setting unit of the range estimating unit 72, for example, estimates the upper limit value Dmax from the representative value De based on an upper limit value estimating rule defining correspondence relation between the representative value De and the upper limit value Dmax. The lower limit setting unit of the range estimating unit 72, for example, estimates the lower limit value Dmin from the representative value De based on a lower limit value estimating rule defining correspondence relation between the representative value De and the lower limit value Dmin. The upper limit value estimating rule and the lower limit value estimating rule may be defined in advance by estimation arithmetic expressions, or may be defined in advance by tables (maps). Respective concrete examples of the estimation arithmetic expressions and the tables (maps) for estimating the upper limit value Dmax and the lower limit value Dmin will be described later. The estimation of the upper limit value Dmax by the upper limit setting unit of the range estimating unit 72 based on the table may reduce a processing load on the CPU 114 when the CPU 114 functions as the upper limit setting unit of the range estimating unit 72, for example. Similarly, the estimation of the lower limit value Dmin by the lower limit setting unit of the range estimating unit 72 based on the table may reduce a processing load on the CPU 114 when the CPU 114 functions as the lower limit setting unit of the range estimating unit 72, for example.

Alternatively, rather than estimating the representative value De from the target value Vref and the detected value of the input voltage Vin and estimating the normal range Dx from the estimated representative value De, the estimator 70 may estimate the normal range Dx without estimating the representative value De. For example, the estimator 70 estimates the normal range Dx based on an upper and lower limit estimating rule for estimating the upper and lower limit values of the normal range Dx from the target value Vref set by the target voltage setting unit 10 and the detected value of the input voltage Vin which detected value is output from the input voltage detector 60. The upper and lower limit estimating rule includes an upper limit estimating rule defining correspondence relation between the target value Vref, the detected value of the input voltage Vin, and the upper limit value Dmax of the normal range Dx and a lower limit estimating rule defining correspondence relation between the target value Vref, the detected value of the input voltage Vin, and the lower limit value Dmin of the normal range Dx. The upper limit estimating rule and the lower limit estimating rule may be defined in advance by estimation arithmetic expressions, or may be defined in advance by tables (maps). The estimation of the upper limit value Dmax and the lower limit value Dmin by the estimator 70 based on the tables may reduce a processing load on the CPU 114 when the CPU 114 functions as the estimator 70, for example.

The abnormality determining unit 80 is an example of a determining unit that determines whether or not the duty ratio control value Dr generated by the compensator 30 has fallen outside the normal range Dx estimated by the estimator 70. When the abnormality determining unit 80 determines that the duty ratio control value Dr generated by the compensator 30 has fallen outside the normal range Dx, the abnormality determining unit 80 determines that a degradation abnormality has occurred in the power supply apparatus 101. When the abnormality determining unit 80 determines that the duty ratio control value Dr generated by the compensator 30 has not fallen outside the normal range Dx (is within the normal range Dx), on the other hand, the abnormality determining unit 80 determines that no degradation abnormality has occurred in the power supply apparatus 101.

The adjustor 90 is an example of an adjustor that adjusts the duty ratio control value Dr according to a result of determination of the abnormality determining unit 80. The adjustment of the duty ratio control value Dr by the adjustor 90 according to the determination result of the abnormality determining unit 80 may reflect the determination result of the abnormality determining unit 80 in the duty ratio control value Dr.

Description will next be made of operation of the power supply apparatus 101 when a degradation abnormality occurs in the power supply apparatus 101. A degradation abnormality of the power supply apparatus 101 represents a change in output characteristics of at least one of the compensator 30, the switching circuit 50, and the output voltage detector 40 due to a degradation. Factors in a degradation abnormality of the power supply apparatus 101 include, for example, a degradation in the photocoupler included in the output voltage detector 40 and a degradation in characteristics of an amplifying unit included in at least one of the compensator 30, the switching circuit 50, and the output voltage detector 40.

When a degradation abnormality occurs in the power supply apparatus 101, a gain K of the output voltage detector 40 changes, and therefore the detected value of the output voltage Vout which detected value is output from the output voltage detector 40 also changes. Relation between the output voltage Vout and the target value Vref in the case of the power supply apparatus 101 is expressed by the following equation.

$$Vout = \frac{G(s) \cdot P(s)}{1 + K \cdot G(s) \cdot P(s)} \cdot Vref \qquad \text{[Expression 1]}$$

G(s) denotes a gain of the compensator 30, P(s) denotes a gain of the switching circuit 50, and s denotes a Laplace operator. For example, when the gain K of the output voltage detector 40 changes due to the occurrence of a degradation abnormality in the power supply apparatus 101, the output voltage Vout also changes.

Figure 4:
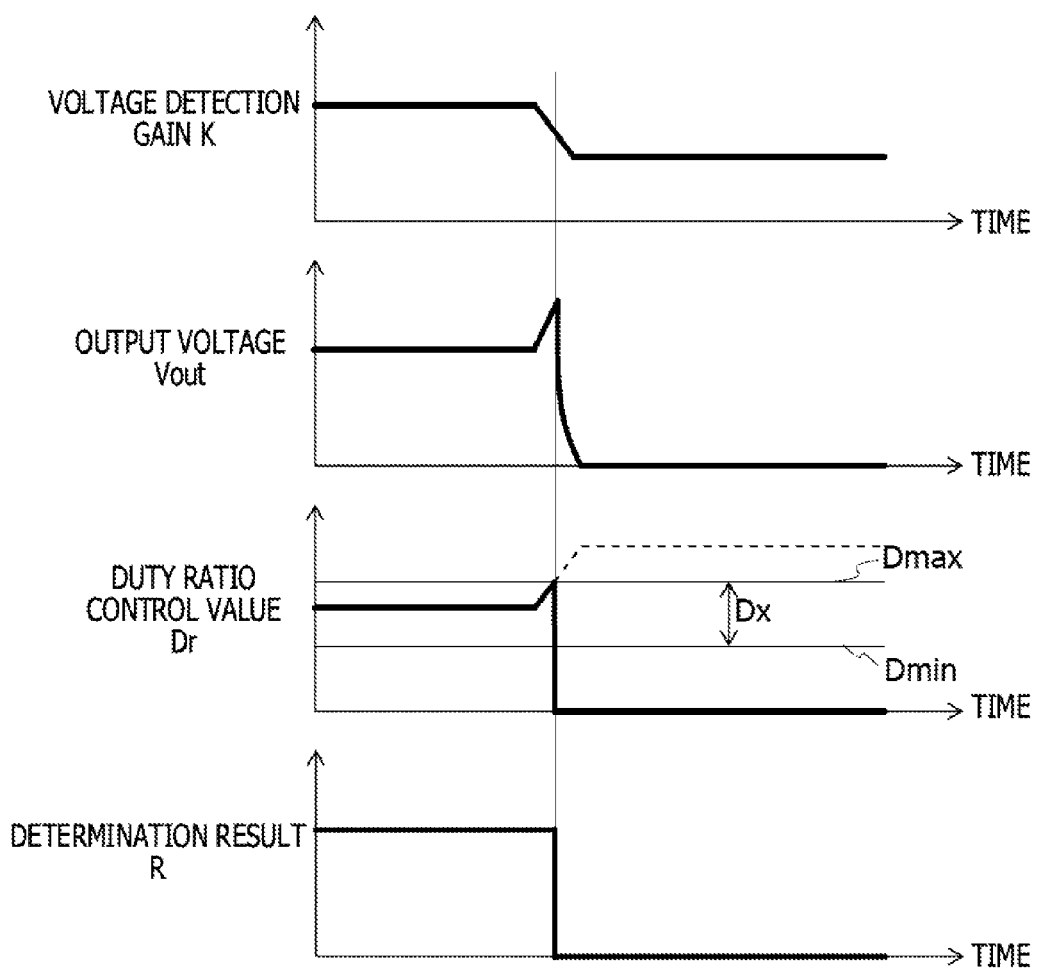
FIG. 4 is a timing diagram illustrating an example of operation of a power supply apparatus when a degradation abnormality occurs in the power supply apparatus.

FIG. 4 is a timing diagram illustrating an example of operation of a power supply apparatus when a degradation abnormality occurs in the power supply apparatus. The power supply apparatus may be the power supply apparatus 101 illustrated in FIG. 3.

When at least one of the compensator 30, the switching circuit 50, and the output voltage detector 40 is degraded, the gain K of the output voltage detector 40 changes. FIG. 4 illustrates a case where the gain K is decreased.

With the decrease in the gain K, the detected value of the output voltage Vout which detected value is output from the output voltage detector 40 decreases, and therefore the error E increases. With the increase in the error E, the compensator 30 raises the duty ratio control value Dr. When the abnormality determining unit 80 determines that the duty ratio control value Dr has exceeded the upper limit value Dmax of the normal range Dx, the abnormality determining unit 80 determines that a degradation abnormality has occurred in the power supply apparatus 101. The abnormality determining unit 80, for example, changes the level of a determination result signal R indicating a result of the determination of whether or not the duty ratio control value Dr has fallen outside the normal range Dx from an inactive level (for example, a high level) to an active level (for example, a low level). The determination result signal R at the inactive level indicates that the duty ratio control value Dr is within the normal range Dx. The determination result signal R at the active level indicates that the duty ratio control value Dr is outside the normal range Dx.

When the abnormality determining unit 80 determines that the duty ratio control value Dr has exceeded the upper limit value Dmax of the normal range Dx, the adjustor 90 adjusts the duty ratio control value Dr so as to stop the switching of the switching circuit 50. For example, when the adjustor 90 detects the determination result signal R at the active level, the adjustor 90 lowers the duty ratio control value Dr to zero as illustrated in FIG. 4 by multiplying the duty ratio control value Dr by zero. The voltage value of the output voltage Vout output from the switching circuit 50 is thereby lowered toward zero.

When the abnormality determining unit 80 determines that the duty ratio control value Dr has exceeded the upper limit value Dmax of the normal range Dx, the adjustor 90 may notify the outside of the power supply apparatus 101 (for example, a user and/or a given apparatus) that a degradation abnormality has occurred in the power supply apparatus 101.

Hence, even when a degradation abnormality that decreases the gain K occurs in the power supply apparatus 101, the output voltage Vout may be protected from continuing rising because the duty ratio control value Dr is limited with the upper limit value Dmax as an upper limit. The power supply apparatus 101 may therefore be protected from continuing operating in the state of the degradation abnormality. In addition, a load to which the output voltage Vout is applied (load supplied with a direct-current power from the switching circuit 50) may be protected from being damaged by an excessive rise in the output voltage Vout.

When the gain K is increased due to a degradation in at least one of the compensator 30, the switching circuit 50, and the output voltage detector 40, on the other hand, the detected value of the output voltage Vout which detected value is output from the output voltage detector 40 rises. When the detected value of the output voltage Vout rises, the error E decreases. With the decrease in the error E, the compensator 30 lowers the duty ratio control value Dr. When the abnormality determining unit 80 determines that the duty ratio control value Dr has become less than the lower limit value Dmin of the normal range Dx, the abnormality determining unit 80 determines that a degradation abnormality has occurred in the power supply apparatus 101. When the abnormality determining unit 80 determines that a degradation abnormality has occurred in the power supply apparatus 101, the abnormality determining unit 80 changes the level of the determination result signal R from the inactive level to the active level.

When the abnormality determining unit 80 determines that the duty ratio control value Dr has become less than the lower limit value Dmin of the normal range Dx, the adjustor 90 adjusts the duty ratio control value Dr so as to stop the switching of the switching circuit 50. For example, when the adjustor 90 detects the determination result signal R at the active level, the adjustor 90 lowers the duty ratio control value Dr to zero as illustrated in FIG. 4 by multiplying the duty ratio control value Dr by zero. The voltage value of the output voltage Vout output from the switching circuit 50 is thereby lowered toward zero.

When the abnormality determining unit 80 determines that the duty ratio control value Dr has become less than the lower limit value Dmin of the normal range Dx, the adjustor 90 may notify the outside of the power supply apparatus 101 (for example, a user and/or a given apparatus) that a degradation abnormality has occurred in the power supply apparatus 101.

Hence, even in the case where a degradation abnormality that increases the gain K occurs in the power supply apparatus 101, the duty ratio control value Dr is forcibly lowered to zero when the duty ratio control value Dr is lowered to the lower limit value Dmin. The power supply apparatus 101 may thereby be protected from continuing operating in a state in which a degradation abnormality that increases the gain K continues.

Description will next be made of an example of a method of detecting an abnormality in the power supply apparatus 101. The method of detecting an abnormality in the power supply apparatus 101 is realized by processing steps illustrated in FIGS. 5 to 7.

Figure 5:
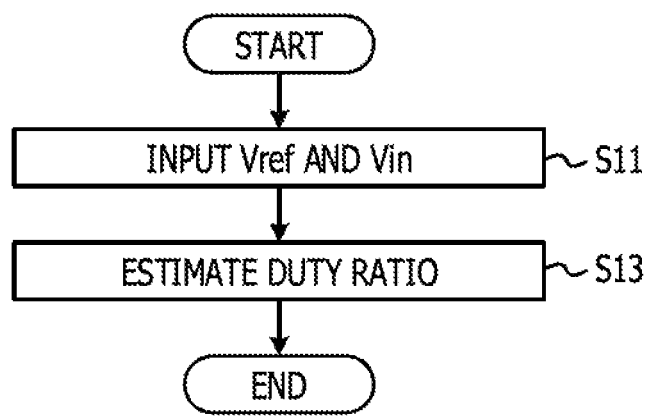
FIG. 5 is a flowchart illustrating an example of operation of a duty ratio estimating unit.

FIG. 5 is a flowchart illustrating an example of operation of a duty ratio estimating unit. The duty ratio estimating unit may be the duty ratio estimating unit 71 illustrated in FIG. 3. The duty ratio estimating unit 71 periodically repeats a series of processing (processing from a "start" to an "end") illustrated in FIG. 5.

In step S11, the duty ratio estimating unit 71 obtains the target value Vref from the target voltage setting unit 10, and obtains the detected value of the input voltage Vin from the input voltage detector 60. In step S13, the duty ratio estimating unit 71 estimates the representative value De of the duty ratio control value Dr from the target value Vref and the detected value of the input voltage Vin that are obtained in step S11.

Figure 6:
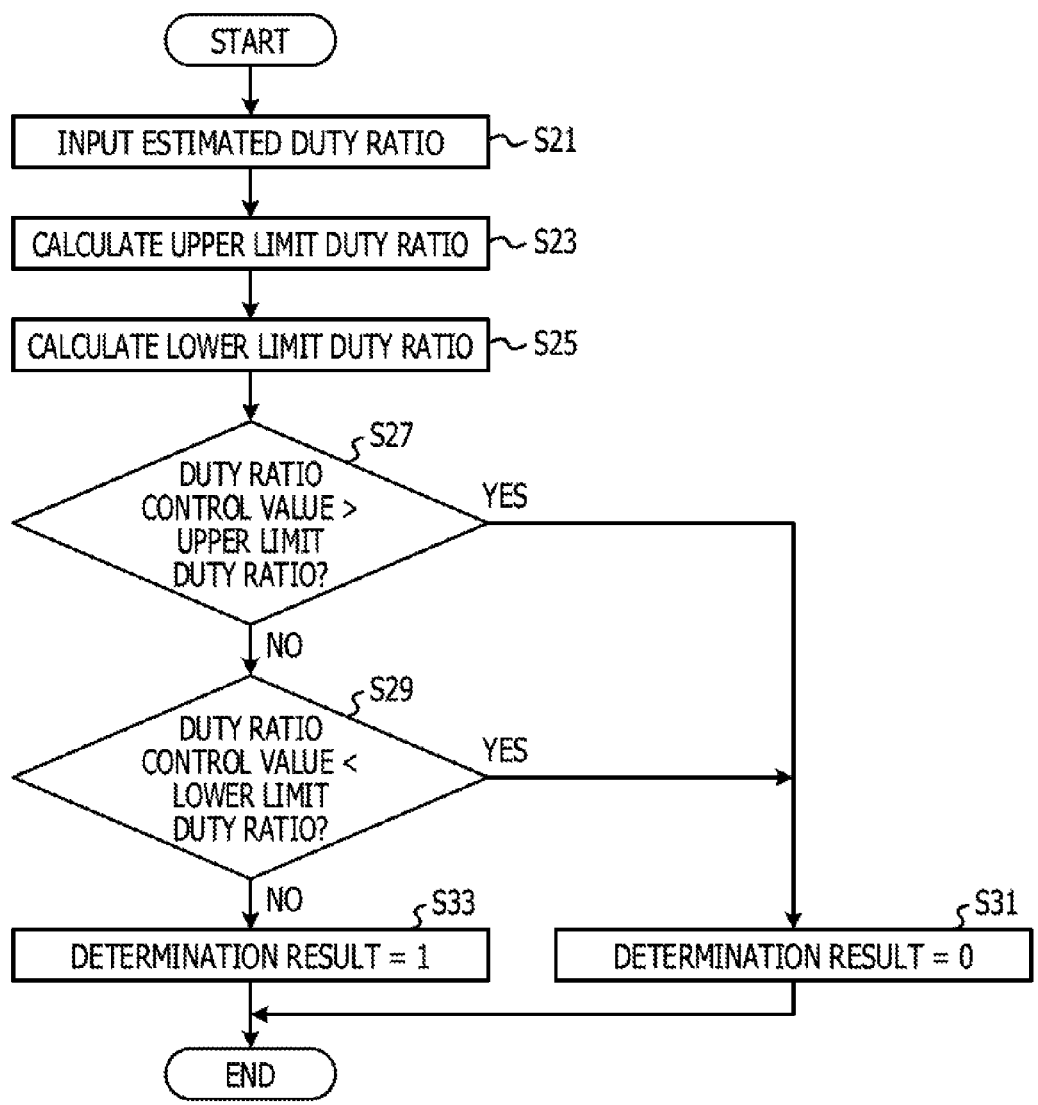
FIG. 6 is a flowchart illustrating an example of operation of a range estimating unit and an abnormality determining unit.

FIG. 6 is a flowchart illustrating an example of operation of a range estimating unit and an abnormality determining unit. The range estimating unit and the abnormality determining unit may be the range estimating unit 72 and the abnormality determining unit 80 illustrated in FIG. 3. A series of processing (processing from a "start" to an "end") illustrated in FIG. 6 is periodically repeated. The processing from step S21 to step S25 is performed by the range estimating unit 72. The processing from step S27 to step S33 is performed by the abnormality determining unit 80.

In step S21, the range estimating unit 72 obtains the representative value De (estimated duty ratio) of the duty ratio control value Dr from the duty ratio estimating unit 71.

In step S23, the range estimating unit 72 sets a value larger than the representative value De obtained in step S21 as the upper limit value Dmax of the normal range Dx. The range estimating unit 72, for example, calculates the upper limit value Dmax (upper limit duty ratio) by multiplying the representative value De by a given coefficient KU larger than one. An example of the coefficient KU will be described later.

In step S25, the range estimating unit 72 sets a value smaller than the representative value De obtained in step S21 as the lower limit value Dmin of the normal range Dx. The range estimating unit 72, for example, calculates the lower limit value Dmin (lower limit duty ratio) by multiplying the representative value De by a given coefficient KL larger than zero and smaller than one. An example of the coefficient KL will be described later. The order of step S25 and step S23 may be interchanged.

In step S27, the abnormality determining unit 80 determines whether or not the duty ratio control value Dr obtained from the compensator 30 is larger than the upper limit value Dmax. When the abnormality determining unit 80 determines that the duty ratio control value Dr is larger than the upper limit value Dmax (Yes in step S27), the abnormality determining unit 80 sets the level of the determination result signal R to a low level (=0) in step S31. When the duty ratio control value Dr is equal to or less than the upper limit value Dmax (No in step S27), on the other hand, the abnormality determining unit 80 performs the processing of step S29.

In step S29, the abnormality determining unit 80 determines whether or not the duty ratio control value Dr obtained from the compensator 30 is smaller than the lower limit value Dmin. When the abnormality determining unit 80 determines that the duty ratio control value Dr is smaller than the lower limit value Dmin (Yes in step S29), the abnormality determining unit 80 sets the level of the determination result signal R to the low level (=0) in step S31. When the duty ratio control value Dr is equal to or more than the lower limit value Dmin (No in step S29), on the other hand, the abnormality determining unit 80 performs the processing of step S33. In step S33, the abnormality determining unit 80 sets the level of the determination result signal R to a high level (=1).

Incidentally, the order of step S27 and step S29 may be interchanged.

Figure 7:
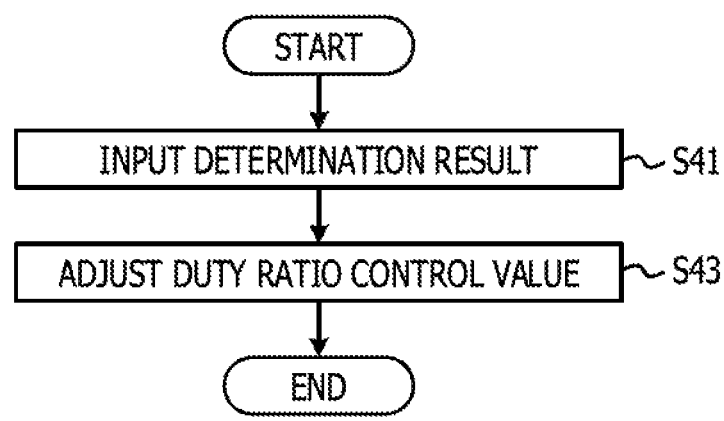
FIG. 7 is a flowchart illustrating an example of operation of an adjustor.

FIG. 7 is a flowchart illustrating an example of operation of an adjustor. The adjustor may be the adjustor 90 illustrated in FIG. 3. The adjustor 90 periodically repeats a series of processing (processing from a "start" to an "end") illustrated in FIG. 7.

In step S41, the adjustor 90 obtains the determination result signal R from the abnormality determining unit 80. In step S43, the adjustor 90 adjusts the duty ratio control value Dr according to the logic level of the determination result signal R obtained in step S41.

In step S43, when the level of the determination result signal R is the high level, the adjustor 90 does not adjust the duty ratio control value Dr by multiplying the duty ratio control value Dr obtained from the compensator 30 by one. When the level of the determination result signal R is the low level, on the other hand, the adjustor 90 adjusts the duty ratio control value Dr to zero by multiplying the duty ratio control value Dr obtained from the compensator 30 by zero. For example, when the duty ratio control value Dr obtained from the compensator 30 is within the normal range Dx, the value of the duty ratio control value Dr obtained from the compensator 30 is maintained. When the duty ratio control value Dr obtained from the compensator 30 is outside the normal range Dx, on the other hand, the value of the duty ratio control value Dr obtained from the compensator 30 becomes zero, so that the value of the duty ratio control value Dr input to the switching circuit 50 also becomes zero.

Hence, the above-described abnormality detecting method may determine whether or not a degradation abnormality has occurred in the power supply apparatus 101 by determining whether or not the duty ratio control value Dr has fallen outside the normal range Dx.

Incidentally, a cycle of the series of processing illustrated in each of FIG. 5, FIG. 6, and FIG. 7 is equal to or more than a cycle in which the compensator 30 generates the duty ratio control value Dr. This is because the duty ratio D changes only in a shorter time than a cycle of response of the compensator 30.

Here, for example, let Vref be the target value for the output voltage Vout, let De be the representative value of the duty ratio control value Dr, let Dmax be the upper limit value of the normal range Dx, let Dmin be the lower limit value of the normal range Dx, let Vmax be a specified upper limit value of the output voltage Vout, and let Vmin be a specified lower limit value of the output voltage Vout. In this case, the range estimating unit 72 may calculate the upper limit value Dmax and the lower limit value Dmin according to:

$$Dmax=De\times(Vmax/Vref)$$

$$Dmin=De\times(Vmin/Vref).$$

Figure 8:
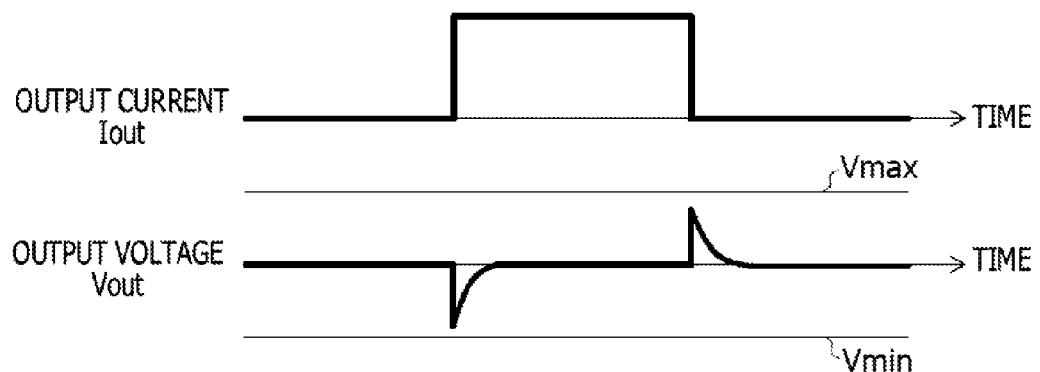
FIG. 8 is a timing diagram illustrating an example of changes in output voltage and output current of a switching circuit.

FIG. 8 is a timing diagram illustrating an example of changes in output voltage Vout and output current Iout of a switching circuit. The switching circuit may be the switching circuit 50 illustrated in FIG. 3. The specified upper limit value Vmax is a maximum value to which the output voltage Vout is allowed to vary. The specified upper limit value Vmax is specified in specifications that the load to which the output voltage Vout is applied requests from the power supply apparatus 101. The specified lower limit value Vmin is a minimum value to which the output voltage Vout is allowed to vary. The specified lower limit value Vmin is specified in the specifications that the load to which the output voltage Vout is applied requests from the power supply apparatus 101.

The load side requests that the power supply apparatus 101 keep the output voltage Vout equal to or more than the specified lower limit value Vmin even when the output current Iout is raised due to a sharp increase in a load current flowing from the switching circuit 50 to the load. Similarly, the load side requests that the power supply apparatus 101 keep the output voltage Vout equal to or less than the specified upper limit value Vmax even when the output current Iout is decreased due to a sharp decrease in the load current flowing from the switching circuit 50 to the load.

For example, setting the upper limit value Dmax of the normal range Dx to a value corresponding to the specified upper limit value Vmax enables the abnormality determining unit 80 to determine that a degradation abnormality that decreases the gain K has occurred in the power supply apparatus 101 when the output voltage Vout has exceeded the specified upper limit value Vmax. Similarly, setting the lower limit value Dmin of the normal range Dx to a value corresponding to the specified lower limit value Vmin enables the abnormality determining unit 80 to determine that a degradation abnormality that increases the gain K has occurred in the power supply apparatus 101 when the output voltage Vout has become less than the specified lower limit value Vmin.

"Dmax=De×(Vmax/Vref)" is an example of an estimation arithmetic expression (an example of the upper limit value estimating rule) for estimating the upper limit value Dmax from the representative value De, the specified upper limit value Vmax, and the target value Vref. "Dmin=De×(Vmin/Vref)" is an example of an estimation arithmetic expression (an example of the lower limit value estimating rule) for estimating the lower limit value Dmin from the representative value De, the specified lower limit value Vmin, and the target value Vref. (Vmax/Vref) is an example of the coefficient KU. (Vmin/Vref) is an example of the coefficient KL.

Alternatively, the range estimating unit 72 may estimate the upper limit value Dmax according to an upper limit value estimating table defining correspondence relation between the representative value De and the upper limit value Dmax, for example. The upper limit value estimating table is, for example, obtained by calculating the upper limit value Dmax corresponding to each representative value De according to "Dmax=De×(Vmax/Vref)" in advance. The upper limit value estimating table obtained by calculating the upper limit value Dmax corresponding to each representative value De in advance is stored in a read only memory (ROM) 116 or an auxiliary storage device 117 (see FIG. 11; details will be described later) in advance, for example.

Similarly, the range estimating unit 72 may estimate the lower limit value Dmin according to a lower limit value estimating table defining correspondence relation between the representative value De and the lower limit value Dmin, for example. The lower limit value estimating table is, for example, obtained by calculating the lower limit value Dmin corresponding to each representative value De according to "Dmin=De×(Vmin/Vref)" in advance. The lower limit value estimating table obtained by calculating the lower limit value Dmin corresponding to each representative value De in advance is stored in the ROM 116 or the auxiliary storage device 117 in advance, for example.

Figure 9:
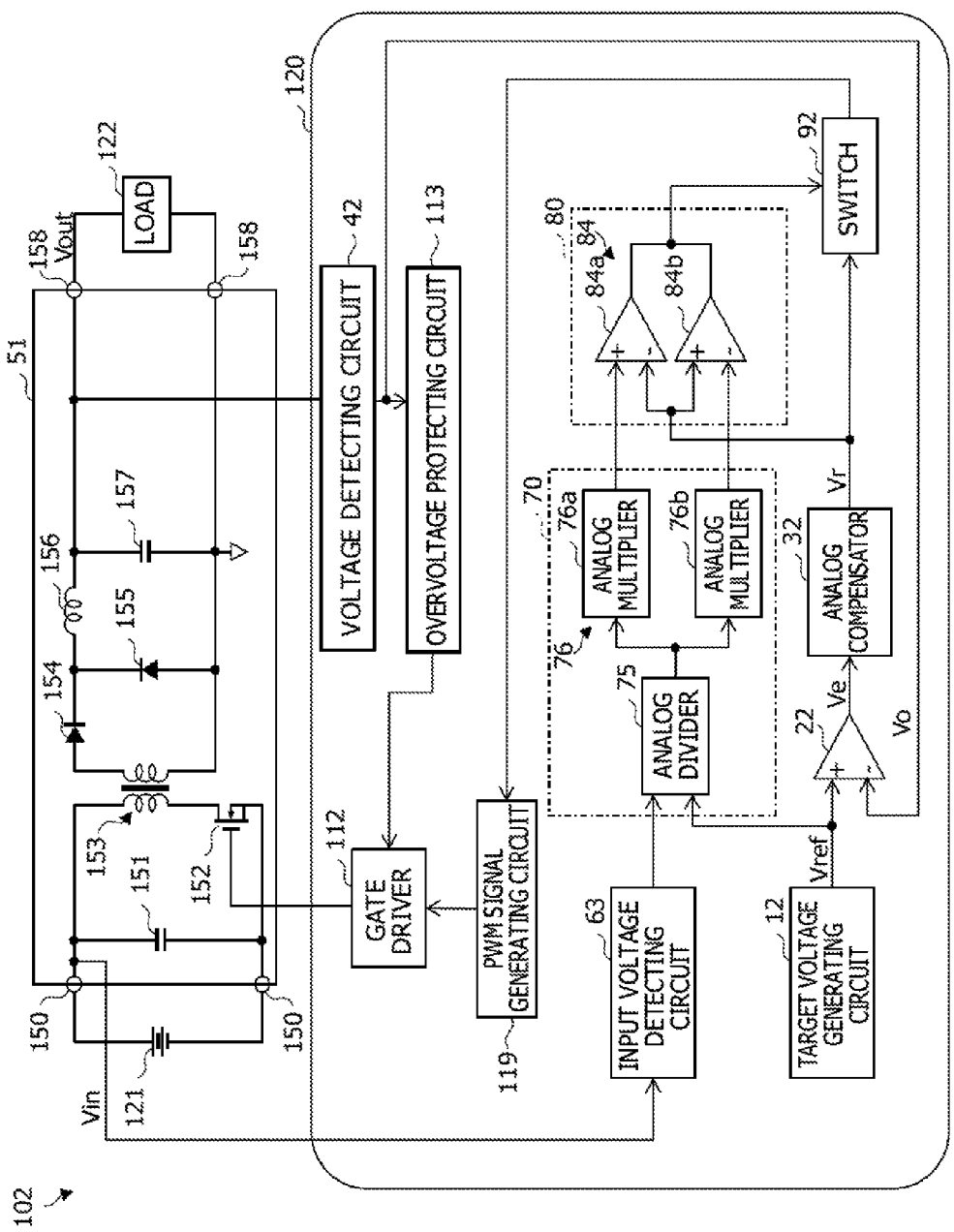
FIG. 9 is a diagram illustrating an example of configuration of a power supply apparatus in a case where degradation abnormality determination for the power supply apparatus is implemented by an analog circuit.

FIG. 9 is a diagram illustrating an example of configuration of a power supply apparatus in a case where degradation abnormality determination for the power supply apparatus is implemented by an analog circuit. A power supply apparatus 102 is one concrete example of the power supply apparatus 101 in FIG. 3. The power supply apparatus 102, for example, includes a switching circuit 51 and a control circuit 120. The control circuit 120, for example, includes a voltage detecting circuit 42, a target voltage generating circuit 12, an operational amplifier 22, an analog compensator 32, an input voltage detecting circuit 63, an estimator 70, an abnormality determining unit 80, and a switch 92.

The switching circuit 51 is an example of the switching circuit 50 in FIG. 3. The switching circuit 51 is an example of a well-known forward converter including a pair of input terminals 150, a pair of output terminals 158, a switching element 152, a transformer 153, capacitors 151 and 157, diodes 154 and 155, and an inductor 156. The switching circuit 51 converts an input voltage Vin input from a direct-current input power supply 121 to the pair of input terminals 150 on the primary side of the transformer 153 into an output voltage Vout to be output from the pair of output terminals 158 on the secondary side of the transformer 153. The switching circuit 51 converts the input voltage Vin into the output voltage Vout by the switching of the switching element 152 coupled to a primary side coil of the transformer 153. The output voltage Vout is applied to a load 122 via the pair of output terminals 158.

The voltage detecting circuit 42 is an example of the output voltage detector 40 in FIG. 3. The voltage detecting circuit 42 outputs an analog detection voltage Vo by subjecting the output voltage Vout to resistance voltage division, for example.

The target voltage generating circuit 12 is an example of the target voltage setting unit 10 in FIG. 3. The target voltage generating circuit 12 generates a fixed target voltage as an example of the target value Vref. The operational amplifier 22 is an example of the error arithmetic unit 20 in FIG. 3. The operational amplifier 22 outputs an error voltage Ve. The analog compensator 32 is an example of the compensator 30 in FIG. 3. The analog compensator 32 generates a duty ratio control voltage Vr. The duty ratio control voltage Vr is an example of the duty ratio control value Dr. The duty ratio control voltage Vr controls a duty ratio D such that the error voltage Ve becomes zero.

Figure 10:
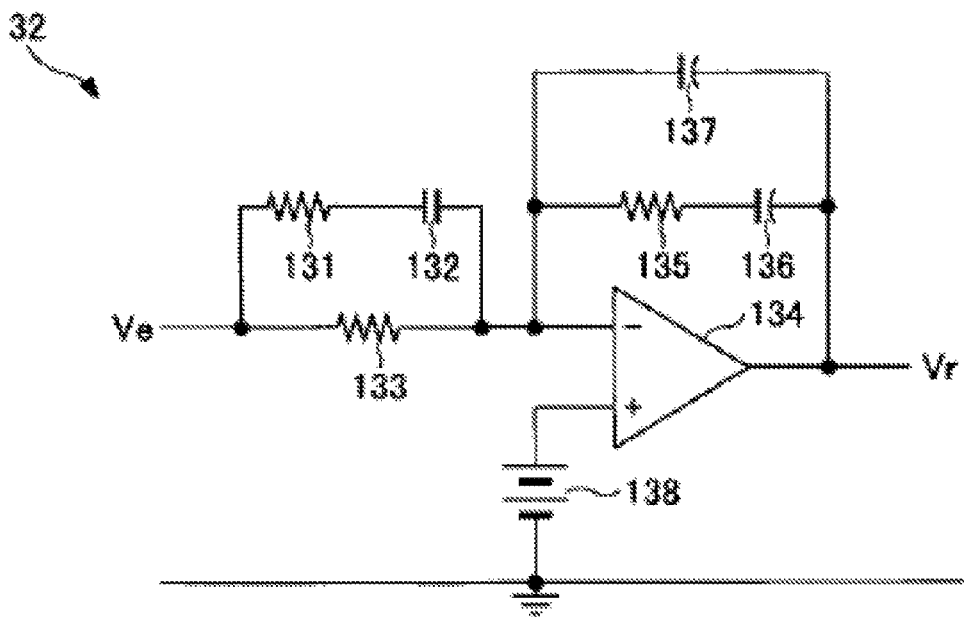
FIG. 10 is a diagram illustrating an example of configuration of an analog compensator.

FIG. 10 is a diagram illustrating an example of configuration of an analog compensator. The analog compensator may be the analog compensator 32 illustrated in FIG. 9. The analog compensator 32 includes a filter circuit formed by an operational amplifier 134. The analog compensator 32 is a well-known circuit including the operational amplifier 134, a reference voltage source 138, resistances 131, 133, and 135, and capacitors 132, 136, and 137. The analog compensator 32 outputs the duty ratio control voltage Vr corresponding to the error voltage Ve.

In FIG. 9, the input voltage detecting circuit 63 is an example of the input voltage detector 60 in FIG. 3. The input voltage detecting circuit 63 outputs an analog detected input voltage by subjecting the input voltage Vin to resistance voltage division.

The estimator 70, for example, includes an analog divider 75 and an analog range calculating unit 76. The analog divider 75 is an example of the duty ratio estimating unit 71. The analog range calculating unit 76 is an example of the range estimating unit 72.

In the case where the switching circuit 51 is the forward converter illustrated in FIG. 9, the following holds:

$$Vout = Vin \times D$$

where D is the duty ratio. Hence, the analog divider 75 calculates the representative value De of the duty ratio control value Dr based on $$D = Vout/Vin.$$

"D=Vout/Vin" is an example of an estimation arithmetic expression for estimating the representative value De from the target value Vref and the detected value of the input voltage Vin.

The analog range calculating unit 76 includes an upper limit analog multiplier 76a and a lower limit analog multiplier 76b. The upper limit analog multiplier 76a is an example of the upper limit setting unit that sets a value larger than the representative value De as the upper limit value Dmax of the normal range Dx. The upper limit analog multiplier 76a calculates the upper limit value Dmax of the normal range Dx by multiplying the representative value De by the coefficient KU, for example. The lower limit analog multiplier 76b is an example of the lower limit setting unit that sets a value smaller than the representative value De as the lower limit value Dmin of the normal range Dx. The lower limit analog multiplier 76b calculates the lower limit value Dmin of the normal range Dx by multiplying the representative value De by the coefficient KL, for example.

The abnormality determining unit 80, for example, includes a window comparator 84. The window comparator 84 includes an upper limit comparator 84a and a lower limit comparator 84b. In the present embodiment, the window comparator 84 outputs zero when the duty ratio control voltage Vr is higher than the upper limit value Dmax or when the duty ratio control voltage Vr is lower than the lower limit value Dmin, and the window comparator 84 outputs one when the duty ratio control voltage Vr is equal to or higher than the lower limit value Dmin and is equal to or lower than the upper limit value Dmax.

The switch 92 is an example of the adjustor 90 in FIG. 3. The switch 92 adjusts the duty ratio control voltage Vr according to the output value of the window comparator 84. The switch 92 is off when the output value of the window comparator 84 is zero. The switch 92 is on when the output value of the window comparator 84 is one.

The control circuit 120, for example, includes a PWM signal generating circuit 119, a gate driver 112, and an overvoltage protecting circuit 113. PWM is an abbreviation of pulse width modulation. The PWM signal generating circuit 119 outputs a PWM signal according to the duty ratio control voltage Vr output from the switch 92. The gate driver 112 switches the switching element 152 according to the PWM signal. The gate driver 112 turns off the switching element 152 when the overvoltage protecting circuit 113 detects that the analog detection voltage Vo is equal to or more than a given overvoltage threshold value.

Figure 11:
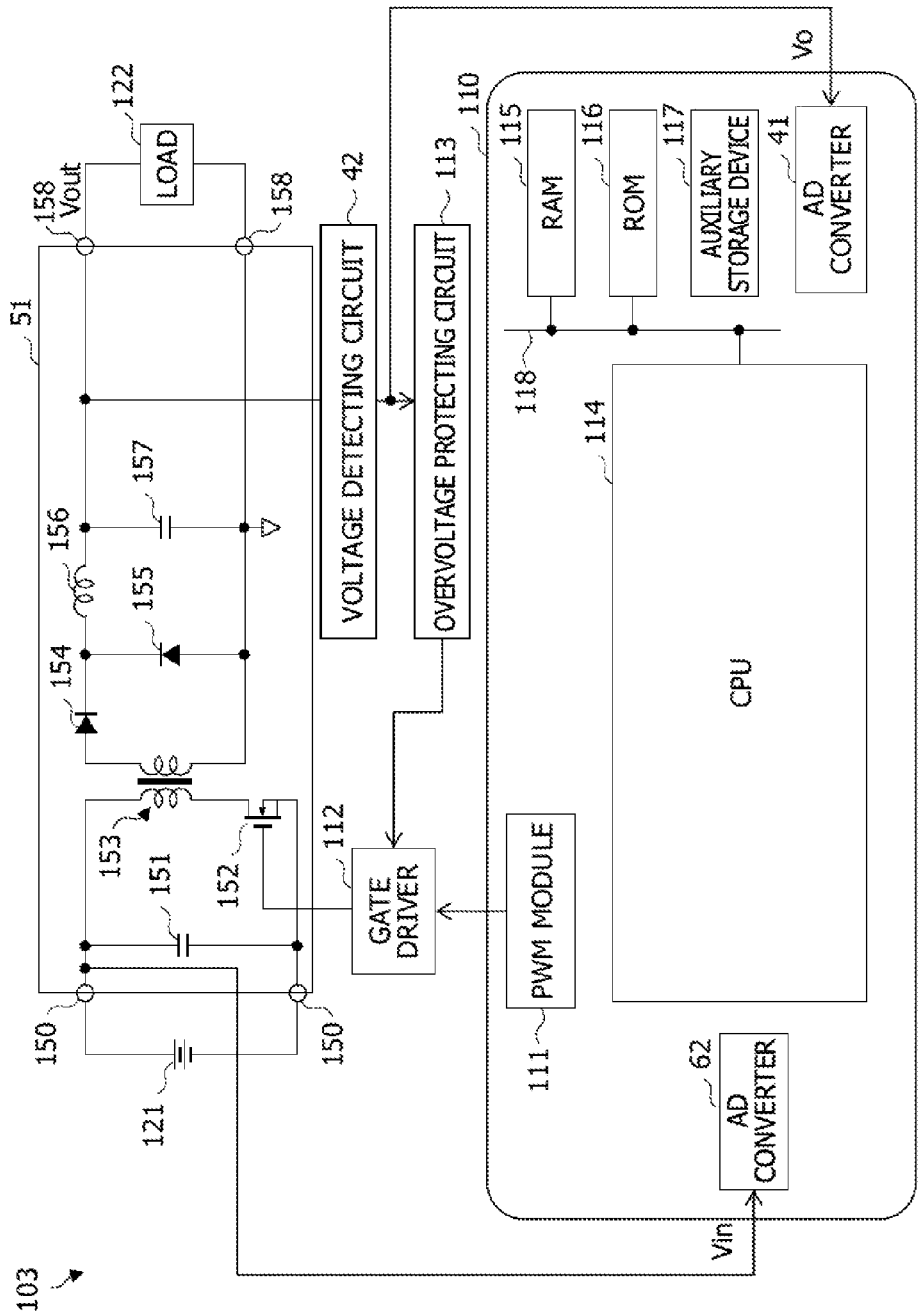
FIG. 11 is a diagram illustrating an example of configuration of a power supply apparatus in a case where degradation abnormality determination for the power supply apparatus is implemented by software.

FIG. 11 is a diagram illustrating an example of configuration of a power supply apparatus in a case where degradation abnormality determination for the power supply apparatus is implemented by software. A power supply apparatus 103 is one concrete example of the power supply apparatus 101 of FIG. 3. The power supply apparatus 103, for example, includes a switching circuit 51, a voltage detecting circuit 42, an overvoltage protecting circuit 113, a gate driver 112, and a microcomputer 110.

The microcomputer 110, for example, includes a PWM module 111, an analog-to-digital (AD) converter 41, an AD converter 62, a CPU 114 as an example of a processor, a random access memory (RAM) 115, a ROM 116, and an auxiliary storage device 117. The auxiliary storage device 117 may be provided outside the microcomputer 110. In the present example, the CPU 114, the RAM 115, and the ROM 116 are coupled to each other by a bus 118. However, the microcomputer 110 is not limited to the configuration in which the CPU 114, the RAM 115, and the ROM 116 are coupled to each other by the bus 118. The ROM 116 stores a program executed by the CPU 114, various kinds of data, and the like.

Figure 12:
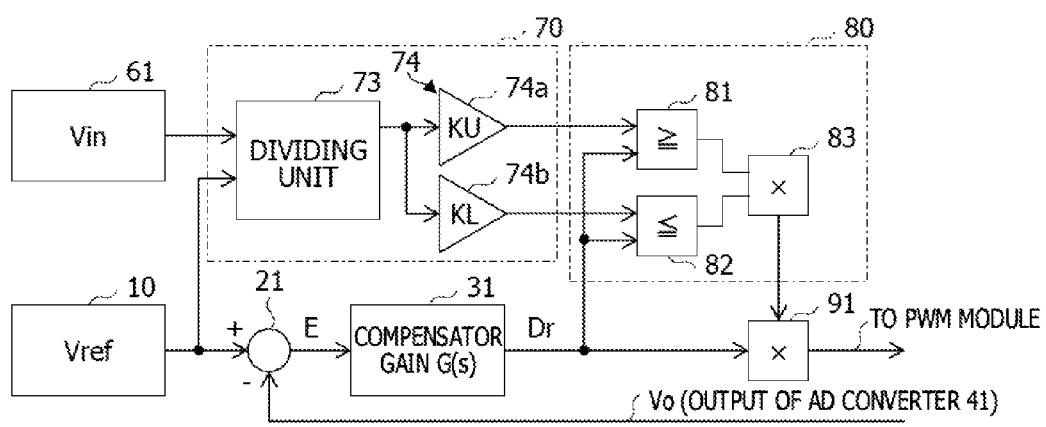
FIG. 12 is a block diagram illustrating a plurality of functions implemented by a central processing unit (CPU)

FIG. 12 is a block diagram illustrating a plurality of functions implemented by a CPU. The CPU may be the CPU 114 illustrated in FIG. 11. The CPU 114 functions as a target voltage setting unit 10, an error arithmetic unit 21, a compensator 31, an input voltage obtaining unit 61, an estimator 70, an abnormality determining unit 80, and a multiplying unit 91 by executing the program stored in the ROM 116.

In FIG. 11, the voltage detecting circuit 42 and the AD converter 41 are an example of the output voltage detector 40 in FIG. 3. The voltage detecting circuit 42, for example, outputs an analog detection voltage Vo by subjecting an output voltage Vout to resistance voltage division. The AD converter 41 converts the analog detection voltage Vo into a digital output voltage detected value, and outputs the digital output voltage detected value.

In FIG. 12, the target voltage setting unit 10, for example, sets a target value Vref for the output voltage Vout to a fixed reference value stored in the ROM 116 in advance. The error arithmetic unit 21 is an example of the error arithmetic unit 20 in FIG. 3. The error arithmetic unit 21 calculates an error E. The compensator 31 is an example of the compensator 30 in FIG. 3. The compensator 31 generates a duty ratio control value Dr controlling the duty ratio D of the switching circuit 51 such that the error E becomes zero.

In FIG. 11 and FIG. 12, the AD converter 62 and the input voltage obtaining unit 61 are an example of the input voltage detector 60 in FIG. 3. The AD converter 62 converts an analog input voltage Vin into a digital input voltage Vin. The input voltage obtaining unit 61 obtains the digital input voltage Vin.

In FIG. 12, the estimator 70, for example, includes a dividing unit 73 and a range calculating unit 74. The dividing unit 73 is an example of the duty ratio estimating unit 71. The range calculating unit 74 is an example of the range estimating unit 72.

In the case where the switching circuit 51 is the forward converter illustrated in FIG. 11, the following holds:

$$Vout = Vin \times D$$

where D is the duty ratio. Hence, the dividing unit 73 calculates the representative value De of the duty ratio control value Dr based on $$D = Vout/Vin$$

"D=Vout/Vin" is an example of an estimation arithmetic expression for estimating the representative value De from the target value Vref and the detected value of the input voltage Vin.

The range calculating unit 74 includes an upper limit calculating unit 74a and a lower limit calculating unit 74b. The upper limit calculating unit 74a is an example of the upper limit setting unit that sets a value larger than the representative value De as the upper limit value Dmax of the normal range Dx. The upper limit calculating unit 74a calculates the upper limit value Dmax of the normal range Dx by multiplying the representative value De by the coefficient KU, for example. The lower limit calculating unit 74b is an example of the lower limit setting unit that sets a value smaller than the representative value De as the lower limit value Dmin of the normal range Dx. The lower limit calculating unit 74b calculates the lower limit value Dmin of the normal range Dx by multiplying the representative value De by the coefficient KL, for example.

The abnormality determining unit 80, for example, includes an upper limit comparing unit 81, a lower limit comparing unit 82, and a multiplying unit 83. In the present embodiment, the upper limit comparing unit 81 compares the upper limit value Dmax and the duty ratio control value Dr with each other to determine magnitude relation between the upper limit value Dmax and the duty ratio control value Dr, and outputs zero when the duty ratio control value Dr is larger than the upper limit value Dmax and outputs one when the duty ratio control value Dr is equal to or less than the upper limit value Dmax. In the present embodiment, the lower limit comparing unit 82 compares the lower limit value Dmin and the duty ratio control value Dr with each other to determine magnitude relation between the lower limit value Dmin and the duty ratio control value Dr, and outputs zero when the duty ratio control value Dr is smaller than the lower limit value Dmin and outputs one when the duty ratio control value Dr is equal to or more than the lower limit value Dmin. The multiplying unit 83 outputs a product of the output value of the upper limit comparing unit 81 and the output value of the lower limit comparing unit 82.

The multiplying unit 91 is an example of the adjustor 90 in FIG. 3. The multiplying unit 91 adjusts the duty ratio control value Dr by multiplying the duty ratio control value Dr by the output value of the multiplying unit 83.

In FIG. 11, the PWM module 111 outputs a PWM signal according to the duty ratio control value Dr output from the multiplying unit 91. The gate driver 112 switches the switching element 152 according to the PWM signal. The gate driver 112 turns off the switching element 152 when the overvoltage protecting circuit 113 detects that the analog detection voltage Vo is equal to or more than a given overvoltage threshold value.

Figure 13:
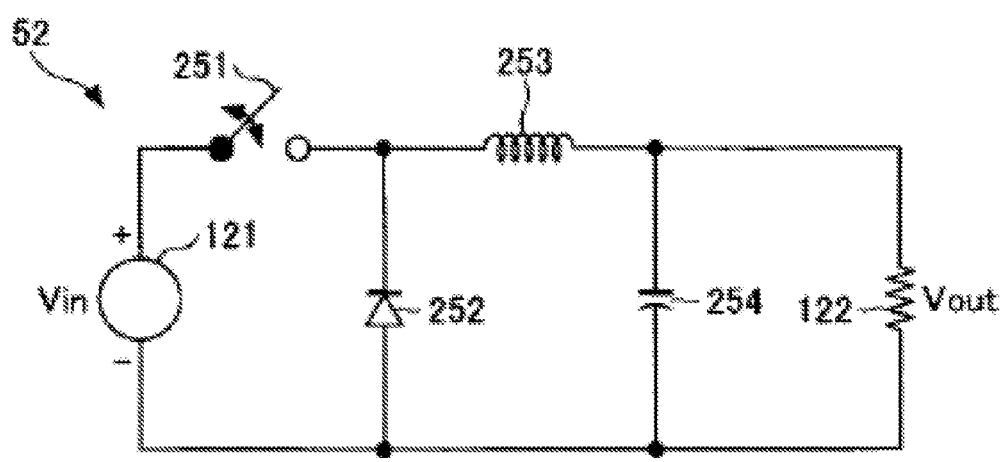
FIG. 13 is a diagram illustrating an example of configuration of a switching circuit.

FIG. 13 is a diagram illustrating an example of configuration of a switching circuit. A switching circuit 52 is an example of the switching circuit 50 in FIG. 3. The switching circuit 52 is an example of a well-known step-down converter including a switching element 251, a capacitor 254, a diode 252, and an inductor 253.

In the case where the switching circuit 52 is the step-down converter illustrated in FIG. 13, the following holds:

$$Vout = Vin \times D$$

where D is the duty ratio. Hence, the duty ratio estimating unit 71 in FIG. 3 calculates the representative value De of the duty ratio control value Dr based on $$D=Vout/Vin.$$

"D=Vout/Vin" is an example of an estimation arithmetic expression for estimating the representative value De from the target value Vref and the detected value of the input voltage Vin.

Figure 14:
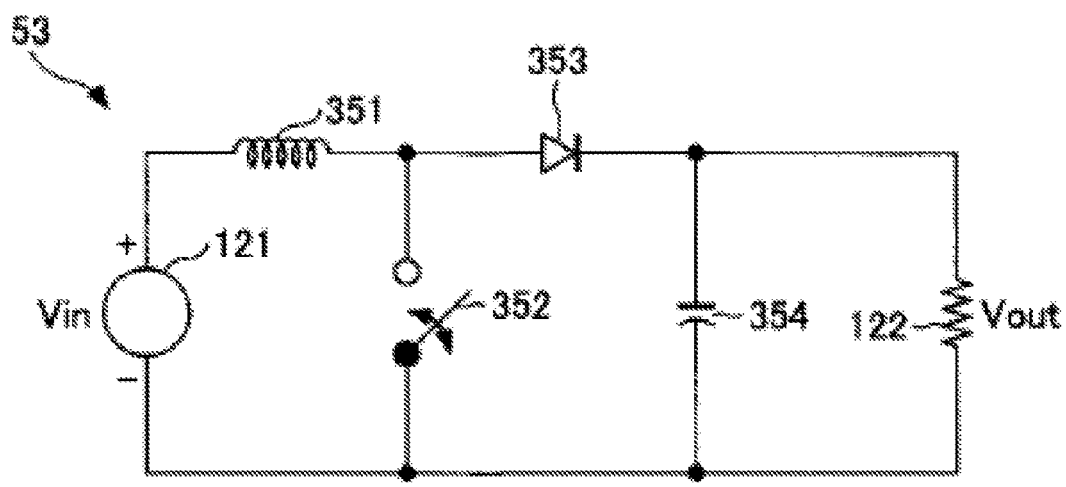
FIG. 14 is a diagram illustrating another example of configuration of a switching circuit.

FIG. 14 is a diagram illustrating an example of configuration of a switching circuit. A switching circuit 53 is an example of the switching circuit 50 in FIG. 3. The switching circuit 53 is an example of a well-known step-up converter including a switching element 352, a capacitor 354, a diode 353, and an inductor 351.

In the case where the switching circuit 53 is the step-up converter illustrated in FIG. 14, the following holds:

$$Vout=Vin/(1-D)$$

where D is the duty ratio. Hence, the duty ratio estimating unit 71 in FIG. 3 calculates the representative value De of the duty ratio control value Dr based on $$D=1-(Vin/Vout).$$

"D=1−(Vin/Vout)" is an example of an estimation arithmetic expression for estimating the representative value De from the target value Vref and the detected value of the input voltage Vin.

Figure 15:
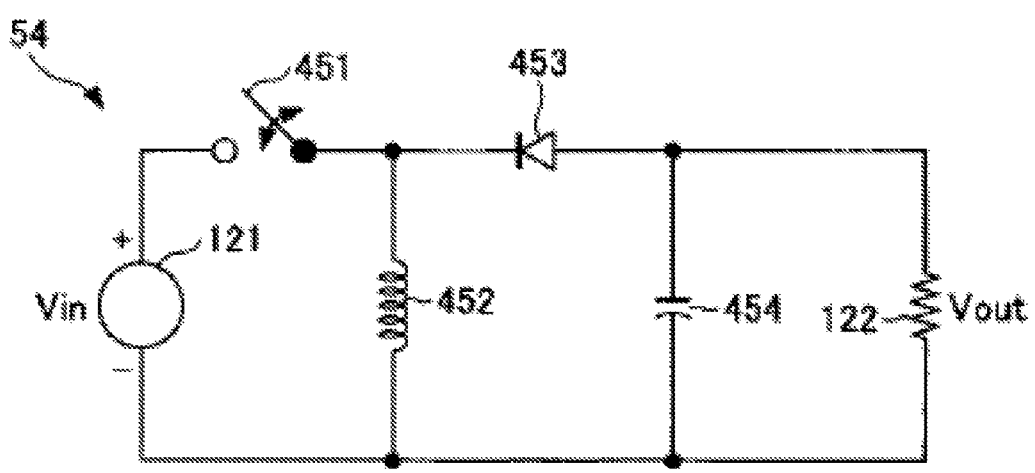
FIG. 15 is a diagram illustrating still another example of configuration of a switching circuit.

FIG. 15 is a diagram illustrating an example of configuration of a switching circuit. A switching circuit 54 is an example of the switching circuit 50 in FIG. 3. The switching circuit 54 is an example of a well-known step-up/step-down converter including a switching element 451, a capacitor 454, a diode 453, and an inductor 452.

In the case where the switching circuit 54 is the step-up/step-down converter illustrated in FIG. 15, the following holds:

$$Vout=-Vin(D/(1-D))$$

where D is the duty ratio. Hence, the duty ratio estimating unit 71 in FIG. 3 calculates the representative value De of the duty ratio control value Dr based on $$D=-Vout/(Vin-Vout).$$

"D=−Vout/(Vin−Vout)" is an example of an estimation arithmetic expression for estimating the representative value De from the target value Vref and the detected value of the input voltage Vin.

Figure 16:
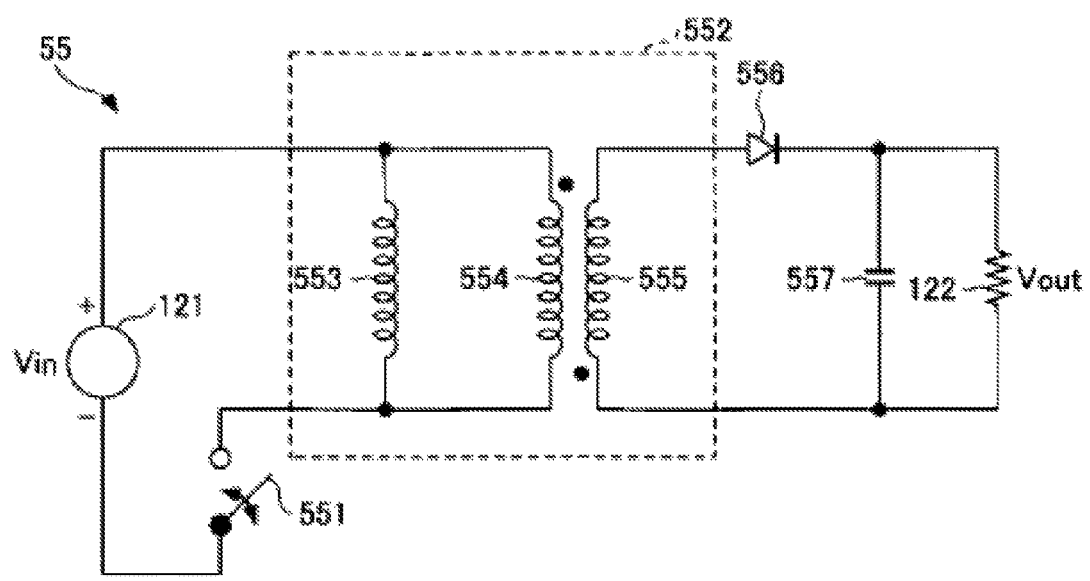
FIG. 16 is a diagram illustrating still another example of configuration of a switching circuit.

FIG. 16 is a diagram illustrating an example of configuration of a switching circuit. A switching circuit 55 is an example of the switching circuit 50 in FIG. 3. The switching circuit 55 is an example of a well-known flyback converter including a switching element 551, a capacitor 557, a diode 556, and a transformer 552. The transformer 552 includes an exciting coil 553, a primary side coil 554, and a secondary side coil 555.

In the case where the switching circuit 55 is the flyback converter illustrated in FIG. 16, the following holds:

$$Vout=Vin\times(D/(1-D))\times(N2/N1)$$

where D is the duty ratio, N1 is the number of turns of the primary side coil 554, and N2 is the number of turns of the secondary side coil 555. Hence, when N1 and N2 are equal to each other, for example, the duty ratio estimating unit 71 in FIG. 3 calculates the representative value De of the duty ratio control value Dr based on $$D=-Vout/(Vin-Vout).$$

"D=−Vout/(Vin−Vout)" is an example of an estimation arithmetic expression for estimating the representative value De from the target value Vref and the detected value of the input voltage Vin.

Figure 17:
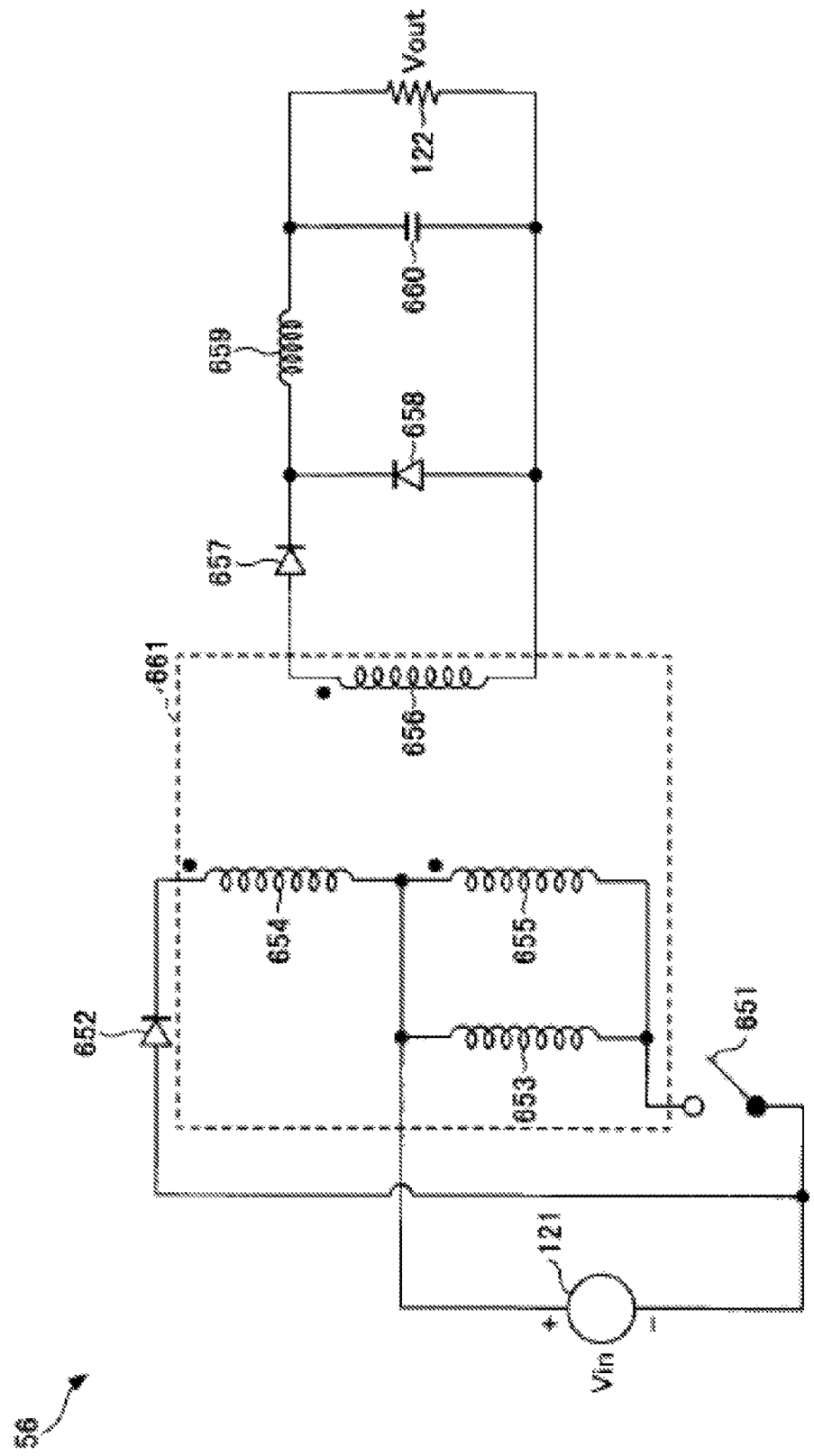
FIG. 17 is a diagram illustrating still another example of configuration of a switching circuit.

FIG. 17 is a diagram illustrating an example of configuration of a switching circuit. A switching circuit 56 is an example of the switching circuit 50 in FIG. 3. The switching circuit 56 is an example of a well-known forward converter including a switching element 651, a capacitor 660, diodes 652, 657, and 658, an inductor 659, and a transformer 661. The transformer 661 includes an exciting coil 653, primary side coils 654 and 655, and a secondary side coil 656.

In the case where the switching circuit 56 is the forward converter illustrated in FIG. 17, the following holds:

$$Vout=Vin\times D\times(N2/N1)$$

where D is the duty ratio, N1 is the number of turns of the primary side coils 654 and 655 combined, N2 is the number of turns of the secondary side coil 656. Hence, when N1 and N2 are equal to each other, for example, the duty ratio estimating unit 71 in FIG. 3 calculates the representative value De of the duty ratio control value Dr based on $$D=Vout/Vin.$$

"D=Vout/Vin" is an example of an estimation arithmetic expression for estimating the representative value De from the target value Vref and the detected value of the input voltage Vin.

A power supply apparatus, a program for detecting an abnormality in the power supply apparatus, and a method for detecting an abnormality in the power supply apparatus have been described above based on the embodiments. However, the present disclosure is not limited to the foregoing embodiments. Various modifications and improvements such as combination with a part or the whole of another embodiment, replacement, and the like may be made within the scope of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power supply apparatus comprising:
 a trans circuit configured to convert an input voltage into an output voltage by adjusting switching of the input voltage;
 an output voltage detection circuit configured to detect the output voltage;
 a compensation circuit configured to generate a control value controlling a duty ratio of the switching such that a value of the detected output voltage coincides with a target value for the output voltage;
 an input voltage detection circuit configured to detect the input voltage;
 an estimation circuit configured to:
  estimate a representative value of an allowed range of the control value in accordance with the target value and a value of the detected input voltage, set an upper limit value of the allowed range to a value larger than the representative value, and set a lower limit value of the allowed range to a value smaller than the representative value; and an adjustment circuit configured to adjust the control value so as to stop the switching when the control value falls outside the allowed range.

2. The power supply apparatus according to claim 1, wherein an upper limit value of the allowed range of the control value is calculated based on a ratio between the upper limit value of the output voltage and the target value for the output voltage, and the lower limit value of the allowed range of the control value is calculated based on a ratio between the lower limit value of the output voltage and the target value for the output voltage.

3. The power supply apparatus according to claim 1, wherein the estimation circuit estimates the allowed range in accordance with the target value and the value of the detected input voltage based on a table for estimating the allowed range.

4. An error detecting method for a power supply apparatus, comprising:

converting an input voltage into an output voltage by adjusting switching of the input voltage;

detecting the output voltage;

generating a control value controlling a duty ratio of the switching such that a value of the detected output voltage coincides with a target value for the output voltage;

detecting the input voltage;

estimating a representative value of an allowed range of the control value in accordance with the target value and a value of the detected input voltage;

setting an upper limit value of the allowed range to a value larger than the representative value;

setting a lower limit value of the allowed range to a value smaller than the representative value; and adjusting the control value so as to stop the switching when the control value falls outside the allowed range.

* * * * *